United States Patent Office 3,256,344
Patented June 14, 1966

3,256,344
PROCESS FOR THE PREPARATION OF DI(1,2-UN-SATURATED ALIPHATIC) ETHERS
Lucian Wayne McTeer, South Charleston, W. Va., assignor to Union Carbide Corporation, a corporation of New York
No Drawing. Filed Apr. 14, 1961, Ser. No. 102,962
11 Claims. (Cl. 260—614)

The invention relates to a novel process for the production of di(1,2-olefinically unsaturated aliphatic) ethers, to novel di(alkadienyl) ethers which can be prepared by the inventive process, and to certain new and useful compositions which can be prepared from the said novel di(alkadienyl) ethers. In a particular aspect, the invention relates to a process which comprises heating a 1,2-olefinically unsaturated aliphatic 1-acyloxyaliphatic ether under the conditions described hereinbelow, and producing thereby a di(1,2-olefinically unsaturated aliphatic) ether. The invention is further concerned with a novel class of compositions which can be produced by the process of the invention, that is, the di(alkadienyl) ethers, with the halogen addition products prepared therefrom, and with certain polymeric compositions prepared therefrom.

Heretofore, the preparation of, for example, divinyl ether has been a difficult and expensive process. The method generally employed was the dehydrohalogenation of di(2-chloroethyl) ether by reaction with an alkali metal hydroxide, carbonate, or bicarbonate. This method was expensive in that the alkali metal and chlorine were lost in the process (by formation of sodium chloride, for example), and was hard to control since the second chlorine atom was difficult to remove, and therefore required strong reaction conditions. In addition, in order to prepare the higher homologues of divinyl ether, the di(haloalkyl) ether precursors must be employed, many of which have not been prepared.

In one aspect, the present invention provides a convenient and economical method for the preparation of di(1,2-olefinically unsaturated aliphatic) ethers which can readily be employed to prepare divinyl ether and higher homologues, and which can also be readily employed to prepare a heretofore unknown class of compounds, the di(alkadienyl) ethers. The process of the invention comprises heating a 1,2-olefinically unsaturated aliphatic 1-acyloxyaliphatic ether under conditions fully described hereinbelow, and preparing thereby a di(1,2-olefinically unsaturated aliphatic ether.

The process of the invention is illustrated by the reaction:

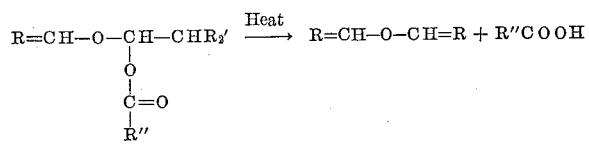

wherein each R individually represents a divalent saturated or unsaturated aliphatic radical that has from one to about eleven carbon atoms and is saturated in the 2,3-position with respect to the ether oxygen, each R' individually represents a hydrogen atom or a monovalent saturated or unsaturated aliphatic radical having from one to about ten carbon atoms provided that the total number of carbon atoms contained in the two variables designated as R' not exceed about ten, and R'' represents a hydrogen atom or a monovalent aromatic or aliphatic radical having from one to about eleven carbon atoms. Hereinafter in the specification, the term "1-alkenyl" will be employed in place of the term "1,2-olefinically unsaturated aliphatic," for the sake of brevity. Thus the term "1-alkenyl" refers not only to monovalent aliphatic radicals which have olefinic unsaturation in the 1,2-position, but is also intended to include monovalent aliphatic radicals which have two olefinic double bonds, one of which is located in the 1,2-position.

The starting materials for the process of the invention are the 1-alkenyl 1-acyloxyaliphatic ethers. These ethers can be prepared by a two-step process which comprises (1) reacting an aliphatic aldehyde which has at least two carbon atoms with the anhydride of a monocarboxylic organic acid in the presence of an acidic catalyst, to produce thereby a di(1-acyloxyaliphatic) ether, and (2) heating said di(1-acyloxyaliphatic) ether to a temperature between about 160° C. and 240° C. to produce a 1-alkenyl 1-acyloxyaliphatic ether and an organic carboxylic acid as a by-product. The following reactions are illustrative of this two-step process:

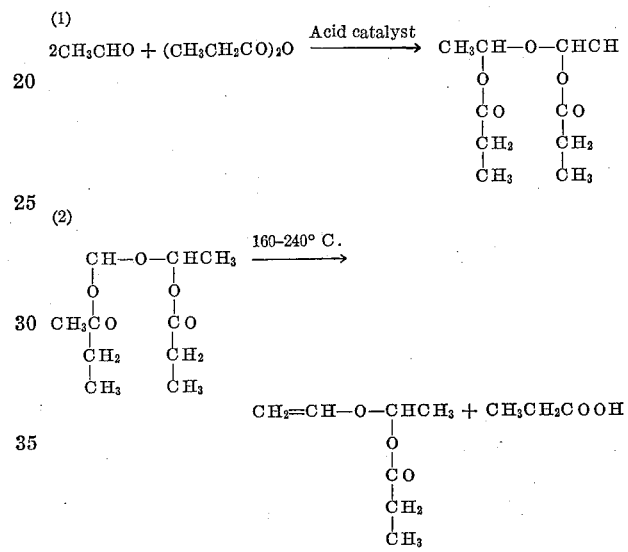

The acid catalyst employed in Reaction 1 is preferably a mineral acid such as sulfuric acid, phosphoric acid, hydrochloric acid, perchloric acid, and the like. In addition, the catalyst can be an organic acid such as trichloroacetic acid, benzenesulfonic acid, picric acid, and the like, or an acid-reacting salt such as zinc chloride, ferric chloride, aluminum chloride, and the like. The catalyst is employed in catalytically significant amounts, for example, from about 0.05 to about 5 weight percent, based on weight of the reactants.

Reaction 1 is exothermic, and is maintained at the desired reaction temperature by alternate heating or cooling, as required. Reaction temperatures between about 0° C. and 150° C. are suitable, with a temperature between about 50° C. and 100° C. being preferred. At the indicated reaction temperatures, it normally takes from about one to about three hours to complete Reaction 1. At the completion of the reaction it is preferred to neutralize the acid catalyst with an equivalent amount of a base, such as sodium hydroxide, ammonium hydroxide, potassium carbonate, or the like.

In carrying out Reaction 1, a molar excess of the aldehyde is required at all times during the course of the reaction. Thus, both the proportions in which the reagents are employed and the method by which they are introduced are of importance to the success of this reaction. At least one mole of aldehyde per mole of acid anhydride must be employed. Good results are obtained by employing up to ten moles of aldehyde per mole of acid anhydride. The reagents can be introduced simultaneously to a suitable reactor, or the anhydride can be added to the aldehyde. However, the procedure of adding the aldehyde to the anhydride is to be avoided, since by so doing, a molar excess of anhydride is obtained which tends to increase the incidence of undesired side reactions.

Variations within the general method of carrying out Reaction 1 can be readily seen. For example, if a mixture of two or more aldehydes are employed, the product will be a mixture of symmetrical and asymmetrical ethers. As an illustration, in the case where a mixture of acetaldehyde and propionaldehyde is employed, the product will contain a mixture of three different ethers, that is, 1-acyloxyethyl 1-acyloxypropyl ether, di(1-acyloxyethyl) ether, and di(1-acyloxypropyl) ether.

In the case where it is desired to produce a di(1-acyloxyaliphatic) ether wherein one or both of the acyloxy radicals are formoxy radicals, the above-described Reaction 1 cannot be employed to directly prepare the desired ether. In this case, a di(1-acyloxyaliphatic) ether is first prepared by Reaction 1 wherein the acyloxy radicals are, for example, acetoxy radicals, and the thus-prepared ether is then subjected to an acid exchange reaction with formic acid whereby the acyloxy radicals contained in the ether are replaced with formoxy radicals. It is pointed out that this acid exchange reaction is a convenient method for preparing asymmetrical di(1-acyloxyaliphatic) ethers which have different acyloxy radicals contained therein.

The acid exchange reaction is carried out by heating a mixture of an organic monocarboxylic acid and a di(1-acyloxyaliphatic) ether to a temperature of up to about 150° C., normally in the presence of a catalytic amount of an acidic catalyst. The acidic catalysts employed are the same as those contemplated for use with Reaction 1, which were described hereinabove, and are normally used in a concentration in the range of from about 0.01 to about 5 weight percent, and preferably from about 0.05 to about 1 weight percent, based upon the total weight of the reactants.

The acid exchange reaction is an equilibrium reaction, and therefore the product will be a mixture of ethers. As an illustration, in the case where formic acid is reacted with a di(1-acetoxyaliphatic) ether, the product will contain di(1-acetoxyaliphatic) ether, di(1-formoxyaliphatic) ether, and 1-formoxyaliphatic 1-acetoxyaliphatic ether. The proportion of the products is governed, to an extent, by the ratio in which the reactants are employed. Thus, if it is desired to obtain a high yield of an asymmetrical di(1-acyloxyaliphatic) ether in which only one of the acyloxy radicals of the ether reactant is replaced, a mole ratio of the order of up to about 2 moles of the monocarboxylic acid reactant per mole of the starting ether is generally employed. On the other hand, if a high yield of the symmetrical di(1-acyloxyaliphatic) ether in which both acyloxy radicals are replaced is desired, a high mole ratio of greater than 5 moles of monocarboxylic acid per mole of the starting ether is generally employed.

The reaction temperature can be varied from about 0° C. to about 150° C., and preferably from about 25° C. to about 100° C. At the indicated temperatures the reaction time can vary from as little as a few minutes up to about 72 hours, or more.

The di(1-acyloxyaliphatic) ethers, which can be produced by the reaction routes discussed hereinabove, are then pyrolyzed to produce the 1-alkenyl 1-acyloxyaliphatic ethers which are employed as the starting materials in the process of the present invention. The pyrolysis, Reaction 2, is carried out by heating the di(1-acyloxyaliphatic) ether to a temperature between about 160° C. and 240° C. A convenient way in which the pyrolysis can be carried out is to charge the ether to a standard reactor equipped with a distillation column, and to heat the ether at reflux, adjusting the pressure if necessary to maintain the temperature within the desired range. The products of the pyrolysis, being lower boiling than the ether, can readily be separated from the reaction mixture by continuous distillation during the reaction. The products of Reaction 2, that is the 1-alkenyl 1-acyloxyaliphatic ether and the organic monocarboxylic acid by-product, can be separated from each other by distillation and/or extraction with water and a suitable organic solvent such as heptane, benzene, chlorinated hydrocarbons, and the like. The acid will be removed in the water layer, and the ether in the organic solvent layer, from which it can be separated by distillation.

In certain instances it may be desirable to add a polymerization inhibitor to the 1-alkenyl 1-acyloxyaliphatic ether in order to stabilize the ether. When the 1-alkenyl radical is singly unsaturated a polymerization inhibitor is not needed, however, when the 1-alkenyl radical contains two double bonds, and particularly two conjugated double bonds, the addition of a polymerization inhibitor is desirable. The inhibitor is employed in the usual amounts, for example, from about 0.01 to about 1.0 weight percent, based upon the weight of the ether. The inhibitors which can be employed include hydroquinone, tertiary butyl catechol, phenothiazine, and the like, as well as amines such as di(2-ethylhexyl) amine, para-aminophenol, N,N'-diphenylphenylenediamine, and the like.

The 1-alkenyl 1-acyloxyaliphatic ethers which can be prepared by the process discussed hereinabove, are employed as the starting reactants in the process of the invention. These ethers can be represented by Formula I (I) 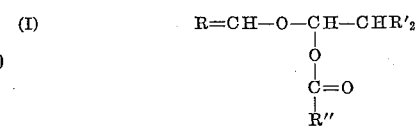

wherein R represents a divalent saturated or unsaturated aliphatic radical having from one to about eleven carbon atoms and which is saturated in the 2,3-position with respect to the ether oxygen, each R' individually represents a hydrogen atom or a monovalent saturated or unsaturated aliphatic radical having from one to about ten carbon atoms provided that the total number of carbon atoms contained in the two variables designated as R' not exceed about ten, and R" represents a hydrogen atom or a monovalent aromatic or aliphatic radical having from one to about eleven carbon atoms.

Examples of radicals which can be the variable designated as R include the alkylidene radicals such as methylene, ethylidene, propylidene, butylidene, pentylidene, hexylidene, heptylidene, octylidene, nonylidene, decylidene, undecylidene, isopropylidene, 1-ethylheptylidene, and the like. In addition, R can be an alkenylidene radical such as 2-propenylidene, 2-butenylidene, 3-butenylidene, 1,2-dimethyl-3-butenylidene, 5-hexenylidene, 9-decenylidene, and the like. The variable R can also be a substituted alkylidene radical such as 2-methoxy-propylidene, 2-butoxypropylidene, and the like. Methylene, ethylidene, propylidene, butylidene, isopropylidene, 3-butenylidene, and 1,2-dimethyl-3-butenylidene are preferred.

Illustrative of the radicals which can be the variable R' are hydrogen, the alkyl radicals such as methyl, ethyl, propyl, butyl, pentyl, hexyl, heptyl, octyl, nonyl decyl, and the like, and the alkenyl radicals such as 1-propenyl, 2-propenyl, 1-methyl-2-propenyl, 4-pentenyl, 8-nonenyl, and the like. In addition, R' can be a substituted alkyl radical such as 1-methoxypropyl, 1-butoxypropyl, and the like. Hydrogen, methyl, ethyl, propyl, and 2-propenyl are preferred.

Exemplary of the radicals which are represented by R" are hydrogen, alkyl radicals such as methyl, ethyl, propyl, butyl, pentyl, hexyl, heptyl, octyl, nonyl, decyl, undecyl, cyclohexyl, cyclopentyl, and the like, alkenyl radicals such as vinyl, 1-methylvinyl, 1-propenyl, 2-propenyl, 3-cyclohexenyl, and the like, and aryl radicals such as phenyl, tolyl, and the like. Methyl is preferred.

The following 1-alkenyl 1-acyloxyaliphatic ethers are illustrative of the compositions which are employed as the starting reactants in the process of the invention: vinyl 1-formoxyethyl ether, vinyl 1-acetoxyethyl ether, vinyl 1-crotonoxyethyl ether, vinyl 1-propionoxyethyl ether, vinyl 1-(3-ethoxypropionoxy)ethyl ether, vinyl 1 - (3-butoxypropionoxy)ethyl ether, vinyl 1-(2-ethylbutyroxy)ethyl ether, vinyl 1 - (2 - ethylhexoxy)ethyl ether, vinyl 1 - dodecanoxyethyl ether, 1 - propenyl 1 - acetoxypropyl ether, 1-propenyl 1-(2-methylpentanoxy)propyl ether, 1-propenyl 1-(2-ethylhexoxy)propyl ether, isobutenyl 1-acetoxyisobutyl ether, 1-butenyl 1-propionoxybutyl ether, 3-methoxy-1-butenyl 1-acetoxy-3-methoxybutyl ether, 1,3-pentadienyl 1-acetoxy-3-pentenyl ether, 3-butoxy-1-butenyl 1-acetoxy-3-butoxybutyl ether, 1,4-pentadienyl 1-acetoxy-4-pentenyl ether, 1,4-pentadienyl 1-crotonoxy-4-pentenyl ether, 2-methyl-1-pentenyl 1-acetoxy-2-methylpentyl ether, 2,3-dimethyl - 1,4 - pentadienyl 1-acetoxy-2,3-dimethyl-4-pentenyl ether, vinyl 1-benzoxyethyl ether, 2-ethyl-1-hexenyl 1-acetoxy-2-ethylhexyl ether, 1-butenyl 1-butyroxy-n-butyl ether, 1-dodecenyl 1-acetoxydodecyl ether, and the like.

Other 1-alkenyl 1-acyloxyaliphatic ethers which can be employed as starting materials in the process of the invention include: vinyl 1-acetoxypropyl ether, 1-propenyl 1-propionoxyethyl ether, isobutenyl 1-acetoxyethyl ether, 1-butenyl 1-propionoxypropyl ether, vinyl 1-acetoxy-3-methoxypropyl ether, vinyl 1-acetoxy-2-ethylhexyl ether, 2-ethyl-1-hexenyl 1-acetoxyethyl ether, vinyl 1-benzoxypropyl ether, and the like.

The process of the invention comprises heating a 1-alkenyl 1-acyloxyaliphatic ether for a period of time sufficient to produce a di(1-alkenyl) ether. The temperature can vary from about 250° C. to about 900° C., preferably from about 300° C. to about 750° C., and most preferably from about 325° C. to about 650° C.

The reaction is preferably carried out as a vapor-phase reaction wherein the 1-alkenyl 1-acyloxyaliphatic ether feed material is maintained at reaction temperature for from about 0.1 second to about 100 seconds, preferably from about 1 to about 25 seconds, and most preferably for from about 2 to about 15 seconds.

The pressure at which the reaction is conducted is not critical, and can be atmospheric, subatmospheric or superatmospheric. The selection of the particular pressure employed will depend, in part, upon factors such as boiling point of the starting reactant, reaction temperature, contact time, and the like.

Standard reaction equipment can be employed. For example, a tube reactor equipped with means for vaporizing the starting material and means for condensing the products of the reaction, is suitable for use in the invention. Suitable materials of construction for the reaction equipment include stainless steel, glass, copper, aluminum, Monel, and the like.

The process of the invention produces both a di(1-alkenyl) ether and an organic carboxylic acid. It is desirable to separate the products from each other and from any unreacted starting material that might be present without undue delay, in order to prevent any recombination from occurring. The product mixture can be separated by standard methods, such as by distillation and extraction, or a combination of the two. Extraction is particularly appropriate where the carboxylic acid is water-soluble, in which case the product mixture can be extracted with water alone or mixed with an organic solvent such as hexane, chlorinated hydrocarbons, dibutyl ether, and the like. Final traces of acid can be removed from the di(1-alkenyl) ether product by washing with water that contains a small amount of an alkali metal hydroxide, carbonate or bicarbonate.

The addition of a polymerization inhibitor to the product mixture is desirable in certain instances. For example, when either or both of the 1-alkenyl radicals contained in the product ether have two double bonds, and particularly two conjugated double bonds, the inclusion of a polymerization inhibitor in the product mixture is desirable. In addition, if the by-product monocarboxylic acid containing alpha, beta-unsaturation such as in acrylic acid, the addition of a polymerization inhibitor is also desirable. The inhibitors are normally employed in amounts ranging from about 0.01 to about 1.0 weight percent, based on total weight of the product mixture. The inhibitors which can be employed include hydroquinone and the alkyl ethers thereof, phenothiazine, tertiary butyl catechol, and the like. After the ether has been separated from the by-product acid, additional polymerization inhibitors which can be added to the ether product include ammonia and amines such as di(2-ethylhexyl) amine, para-aminophenol, N,N'-diphenylphenylenediamine, and the like.

The di(1-alkenyl) ethers that can be prepared by the process of the invention are exemplified by compounds such as: divinyl ether, di(1-propenyl) ether, di(1-butenyl) ether, diisobutenyl ether, di(1-pentenyl) ether, di(1-hexenyl) ether, di(1-heptenyl) ether, di(2-ethyl-1-hexenyl) ether, di(1-dodecenyl) ether, vinyl 1-propenyl ether, vinyl 1-butenyl ether, vinyl 2-ethyl-1-hexenyl ether, 1-butenyl 1-propenyl ether, di(3-methoxy-1-butenyl) ether, di(3-ethoxy)-1-propenyl) ether, di(1,4-pentadienyl) ether, di(1,4-hexadienyl) ether, di(1,3-pentadienyl) ether, di(2,3-dimethyl-1,4-pentadienyl) ether, and the like.

In another aspect, the invention relates to a novel class of compounds, the di(alkadienyl) ethers, which can be prepared by the process of the invention. The di(alkadienyl) ethers can be represented by Formula II (II) 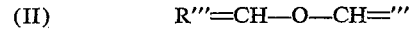

wherein each R''' individually is a divalent aliphatic radical which has from three to eleven carbon atoms, which has one olefinic double bond contained therein, and which is saturated in the 2,3-position with respect to the ether oxygen. The following alkenylidene radicals are illustrative of the variable R''': 2-propenylidene, 2-butenylidene, 3-butenylidene, 1,2-dimethyl-3-butenylidene, 5-hexenylidene, 9-decenylidene, 10-undecenylidene 4-pentenylidene, 6-heptenylidene, and the like. Illustrative of the di(alkadienyl) ethers which are contemplated by the invention are di(1,4-pentadienyl) ether, di(1,3-butadienyl) ether, di(1,3-pentadienyl) ether, di(2-,3-dimethyl-1,4-pentadienyl) ether, di(1,4-hexadienyl) ether, di(1,5-hexadienyl) ether, di(2-ethyl-1,4-hexadienyl) ether, di(1,7-octadienyl) ether, di(1,4-decadienyl) ether, di(1,4-undecadienyl) ether, di(4-methoxy-1,4-pentadienyl) ether, 1,4-pentadienyl 1,4-hexadienyl ether, and the like. The preferred di(alkadienyl) ethers are di(1,4-pentadienyl) ether and di(2,3-dimethyl-1,4-pentadienyl) ether.

The invention is further concerned with another novel class of compositions, the halogenated di(alkadienyl) ethers. These compositions are the halogen addition products of the di(alkadienyl) ethers of the invention. They can be prepared by reacting a halogen, preferably chlorine or bromine, with the di(alkadienyl) ethers provided by this invention, for a period of time sufficient to halogenate at least one, and preferably all, of the olefinic double bonds contained in the starting ether. The halogenation reaction is conducted by standard methods, for example, by slowly adding a halogen to the starting ether, and continuing the addition until the desired proportion of the olefinic double bonds have been halogenated. The starting ether is preferably dissolved in an inert diluent such as chloroform, with the reaction mixture being contained in a standard reaction vessel equipped with conventional heat transfer means. The halogenation is preferably carried out at low temperature, for example, from about −5° C. to about +10° C., with the temperature being maintained by external cooling. Since the addition of a halogen, particularly chlorine or bromine, to an olefinic double bond is rapid, the reaction time is governed principally by the rate at which the halogen is added to the reaction mixture. The halogen can be added at as rapid a rate as is consistent with maintaining the reaction at the desired temperature, for example, from about one to about three moles of halogen per hour per mole of di(alkadienyl) ether.

Illustrative of the halogenated di(alkadienyl) ethers contemplated are di(1,2,4,5-tetrachloropentyl) ether, di (1,2,4,5-tetrabromopentyl) ether, di(2,3-dimethyl-1,2,4, 5-tetrachloropentyl) ether, di(1,2,3,4-tetrachloropentyl) ether, di(1,2,3,4-tetrachlorobutyl) ether, di(1,2,3,4,5-tetrabromohexyl) ether, di(2-ethyl-1,2,4,5-tetrachlorohexyl) ether, 1,2,4,5-tetrachloropentyl 1,2,4,5-tetrachlorohexyl ether, and the like. The preferred halogenated di(alkadienyl) ether is di(1,2,4,5-tetrachloropentyl) ether.

Although the preferred embodiments of this aspect of the invention are the fully halogenated di(alkadienyl) ethers, the partially halogenated di(alkadienyl) ethers are also within the scope of this invention. Thus, compounds such as di(1,2-dichloro-4-pentenyl) ether, 1,2-dichloro-4-pentenyl 1,4-pentadienyl ether, di(2,3-dimethyl-1,2-dibromo-4-pentenyl) ether, and the like are contemplated by the invention.

Another aspect of the invention relates to polymers which comprise the polymerized di(alkadienyl) ethers of the invention. These polymers are prepared by heating an admixture of a di(alkadienyl) ether and a catalytic amount of a polymerization catalyst, for a period of time sufficient to produce a di(alkadienyl) ether polymer. The invention contemplates not only homopolymers and copolymers of the di(alkadienyl) ethers, but also copolymers with other polymerizable monomers, for example, vinyl chloride, vinyl acetate, acrylonitrile, methyl methacrylate, styrene, acrylic acid, vinylidene chloride, cyclohexene, and the like. The ethers polymerize through one or more of the four olefinic double bonds contained in each ether molecule to produce a normally-solid polymeric composition.

The polymerization is carried out at a temperature in the range of from about 20° C., or lower, to about 150° C., or higher, preferably from about 50° C. to about 125° C., and most preferably from about 75° C. to about 110° C. At these temperatures, the polymerization will normally take from about 30 minutes to about 100 hours, and preferably from about 1 hour to about 75 hours.

The catalysts employed are those which induce polymerization in an olefinically-unsaturated compound. Examples of catalysts which can be employed are the organic peroxides including the dialkyl peroxides such as diethyl peroxide, dilauryl peroxide, ditertiary-butyl peroxide, and the like, the alkyl and aryl hydrogen peroxides such as tertiary-butyl peroxide, cumene hydroperoxide, and the like, the symmetrical acyl peroxides such as dibenzoyl peroxide, diacetyl peroxide, dipropionyl peroxide, and the like, mixed diacyl peroxides such as acetyl benzoyl peroxide, and the like, the ketone peroxides such as methyl ethyl ketone peroxide, and the like. Other groups of compounds which can be employed as a polymerization catalyst include the salts of inorganic peracids such as potassium persulfate, ammonium persulfate, sodium perchlorate, potassium perphosphate, sodium perborate and the like, certain azo compounds such as azo-, bis-isobutyronitrile, and the like, boron trifluoride and its complexes with ethers or amines, and many other compounds which are known to initiate polymerization of olefinically-unsaturated compounds.

The catalyst is employed in catalytically-significant amounts, generally from about 0.01 to about 5.0 weight percent, and preferably from about 0.05 to about 1.0 weight percent, based upon the total weight of the di (alkadienyl) ether monomer.

The polymerization can be carried out by either the solution, suspension, or bulk polymerization routes, whichever is desired. Organic vehicles which are suitable for use in the solution polymerization technique (that is, organic compounds which ae solvents for both the monomeric ether and the polymer derived therefrom) include hydrocarbons such as benzene, toluene, xylene, hexane, cyclohexane, and the like, chlorinated hydrocarbons such as ethylene dichloride, and the like, and ethers such as diisopropyl ether, tetrahydrofuran, dioxane, and the like. Organic vehicles which are solvents for the monomer but non-solvents for the polymer, and therefore are suitable for the suspension polymerization technique, include the alcohols such as isopropanol and n-butanol. The concentration of the reactants in the organic vehicle is not critical, and can vary over a wide range, for example, from about 5 weight percent to 50 weight percent, based on total weight of reactants plus organic vehicle.

The pressure at which the polymerization is carried out is not critical, and therefore can be subatmospheric, atmospheric, or superatmospheric, whichever is desired. The polymerization can be carried out in a standard reaction vessel equipped with conventional heat transfer means. Suitable materials of construction include glass, stainless steel, steel, copper, aluminum, Monel, and the like.

The polymer can be recovered from the reaction mixture by standard methods such as by distillation to remove any organic vehicle and/or unreacted monomer which might be present.

The compounds which are produced by the process of the invention, and their derivatives thereof, are highly useful compositions. For example, divinyl ether can be employed as an anesthetic and as a polymerizable monomer. Any of the ethers which are prepared by the process of the invention can be employed as polymerizable monomers and can be polymerized either by themselves or in combination with one or more other polymerizable monomers to produce polymers having utility as surface coatings, and in the case of the poly[di(alkadienyl) ethers], as constituents in the adhesive portion of pressure sensitive tapes. The ethers produced by the process of the invention can be employed as chemical intermediates, for example, as the diene in a Diels-Alder type reaction to produce other useful chemical intermediates. The halogenated di(alkadienyl) ethers are useful as selective solvents, plasticizers, and the like. The partially halogenated di(alkadienyl) ethers have additional utility as polymerizable monomers. The ethers produced by the process of the invention and the partially halogenated di(alkadienyl) ethers can be employed to produce vicinal epoxides by reaction with an epoxidizing reagent such as peracetic acid. One or more of the olefinic double bonds contained in the ethers can be epoxidized to produce compositions having utility in the resin arts, as plasticizers, and the like.

The following examples illustrate the several aspects of the invention.

*Example I.—Preparation of di(1-acetoxyethyl) ether*

A mixture was prepared containing 1778 grams (40.4 moles) of acetaldehyde and 1825 grams (17.9 moles) of acetic anhydride, each component having been cooled prior to admixture to a temperature of 0° C. Another mixture was prepared by adding 9.2 grams of 95 percent sulfuric acid to 603 grams (5.9 moles) of acetic anhydride. At a rate proportional to their volumes, the two mixtures were then fed simultaneously into a glass flask equipped with a stirrer, thermometer, and brine-cooled reflux condenser, and which was surrounded by a water bath. An exothermic reaction occurred upon the introduction of the mixtures into the glass flask and the temperature of the reaction mixture rose rapidly to 50° C. With the temperature of the water bath maintained at 20° C., the rates of feed of the two mixtures were adjusted so as to maintain the temperature of the reaction mixture between 45° C. and 50° C. The feeding of the reactants was completed in 45 minutes. The reaction was allowed to continue for an additional 35 minutes at a temperature maintained between 40° C. and 60° C.

The sulfuric acid catalyst was then neutralized by the addition of 20 grams of 50 percent aqueous sodium hydroxide, after which the crude product was subjected to distillation. The still column employed for the distillation was 41 millimeters in diameter, 48 inches in length, and was packed with 0.16-inch by 0.16-inch protruded packing. The distillation was started under an absolute pressure of 200 millimeters of mercury, and the pressure was decreased gradually during the course of the distillation to a minimum of 10 millimeters of mercury. The products from the distillation included 711 grams (16.2 moles) of acetaldehyde and para-acetaldehyde, 801 grams (7.9 moles) of acetic anhydride, 152 grams (2.5 moles) of acetic acid, 560 grams (3.8 moles) of ethylidene diacetate, and 1826 grams (9.6 moles) of di(1-acetoxyethyl) ether. The conversion of acetaldehyde was 66.7 percent, while that of acetic anhydride was 66.9 percent. The efficiencies based on acetaldehyde were 79.3 percent to di(1-acetoxyethyl) ether and 15.8 percent to ethylidene diacetate. Based on acetic anhydride, the efficiencies were 60.4 percent to di(1-acetoxyethyl) ether and 24.1 percent to ethylidene diacetate. The di(1-acetoxyethyl) ether product had a purity of more than 99 percent and had the following physical properties: a boiling point of 80° C. at an absolute pressure of 10 millimeters of mercury, a specific gravity at 20/20° C. of 1.069, and a refractive index of 1.4081 at a temperature of 20° C. Corresponding physical property values for the ethylidene diacetate were 60° C., 1.076, and 1.4015, respectively.

*Example II.—Preparation of di(1-acetoxy-4-pentenyl) ether*

In a manner and using equipment similar to that described in Example I, 4-pentenal and acetic anhydride were reacted using a mol ratio of 1.7 moles of aldehyde per mole of anhydride, and using a sulfuric acid catalyst in a concentration of 0.3 percent by weight based upon the total weight of the reactants. The feeding of the reactants was carried out over a period of about 30 minutes, during which time the temperature of the reaction mixture was maintained at about 55° C. Thereafter, the reaction was allowed to continue for an additional period of 16 hours at a temperature of about 30° C. Upon completion of the reaction, the acid catalyst was neutralized and the crude product resolved by distillation into its component parts. The products obtained in this manner included both di(1-acetoxy-4-pentenyl) ether as the major product and 1,1-diacetoxy-4-pentene, such products having been formed in a di(1-acyloxyaliphatic) ether to 1,1-aldehyde diacylate mol ratio of 3.2:1. The conversion of 4-pentenal was 89.5 percent, while that of acetic anhydride was 85.0 percent. The efficiencies based on 4-pentenal were 52.2 percent to di(1-acetoxy-4-pentenyl) ether and 10.0 percent to 1,1-diacetoxy-4-pentene. Based on acetic anhydride, the corresponding efficiencies were 49.0 percent and 38.0 percent, respectively. The di(1-acetoxy-4-pentenyl) ether product had the following physical properties: a boiling point of 90° C. at an absolute pressure of 0.5 millimeters of mercury, a specific gravity at 20/20° C. of 1.021 and a refractive index of 1.4426 at a temperature of 20° C.

*Example III.—Preparation of vinyl 1-acetoxyethyl ether*

The apparatus used in this experiment consisted of a 2-liter still kettle surmounted by a column 40 millimeters in diameter and 36 inches in length. The column was packed with 0.16-inch x 0.16-inch protruded stainless steel packing. To the still kettle there were charged 952 grams of di(1-acetoxyethyl) ether. Heat was applied to the kettle rapidly enough to cause the contents to boil vigorously at atmospheric pressure. The temperature of boiling contents of the kettle was 192° C. The still was operated under total reflux for about one-half hour until the vapor temperature descended to 124° C., at which point the removal of distillate was begun. Over a period of 12 hours, a distillate amounting to 822 grams was removed at a head temperature ranging from 122° C. to 126° C. and at an average reflux ratio of 5 to 1. The final kettle temperature was 198° C. Chemical analysis of the distillate showed an acetic acid content of 31.2 percent by weight as compared with a theoretical value of 31.6 percent by weight. Analysis of the distillate for ester content showed a concentration of 69.0 percent by weight as determined by saponification, and 69.8 percent by weight as measured by a determination of unsaturation; the ester in each case was calculated as vinyl 1-acetoxyethyl ether. These results compare with a theoretical value of 68.4 percent by weight, assuming quantitative conversion of di(1-acetoxyethyl) ether to acetic acid and vinyl 1-acetoxyethyl ether. Analysis by saponification of the final kettle residue of 85 grams showed it to consist of 95 percent by weight of di(1-acetoxyethyl) ether. The difference between the charge and the total of the distillate and residue was 45 grams. This material was retained in the column packing and consisted of a mixture of di(acetoxyethyl) ether, acetic acid, and vinyl 1-acetoxyethyl ether. From the foregoing results, it is apparent that the degree of conversion was about 90 percent and that the efficiency from di(1-acetoxyethyl) ether to vinyl 1-acetoxyethyl ether and acetic acid was substantially quantitative.

The distillate was redistilled in a 30-plate, glass Oldershaw column under an absolute pressure of 50 millimeters of mercury and at a reflux ratio of 5 to 1. The first fraction of 130 grams was removed at a head temperature of from 47° C. to 49.5° C. Of this material, 89 percent by weight was acetic acid and 11 percent by weight was vinyl 1-acetoxyethyl ether. Several intermediate fractions then were removed at a gradually increasing head temperature, each fraction containing a higher concentration of vinyl 1-acetoxyethyl ether and a lower concentration of acetic acid. A final fraction of 300 grams was removed from the still at a head temperature of 58.5° to 59° C. Of this material, 98 percent by weight was vinyl 1-acetoxyethyl ether and 2 percent by weight was acetic acid. The final fraction was redistilled in the presence of an amount of sodium hydroxide equivalent to 120 percent by weight of the contained acetic acid, thereby yielding pure vinyl 1-acetoxyethyl ether having a boiling point of 59° C., at an absolute pressure of 50 millimeters of mercury. The vinyl 1-acetoxyethyl ether product had an indicated purity of 100 percent. In addition, the purified vinyl 1-acetoxyethyl ether product had the following physical properties: a specific gravity of 0.976 at 20/20° C. and a refractive index of 1.4083 at a temperature of 20° C.

*Example IV.—Preparation of 1,4-pentadienyl 1-acetoxy-4-pentenyl ether*

Di(1-acetoxy-4-pentenyl) ether was subjected to pyrolysis using equipment and in a manner similar to that described in Example III. The still was operated under an absolute pressure of 210 millimeters of mercury. The kettle temperature was maintained in the range of from 210° to 220° C. and the average head temperature was 140° C. The duration of the experiment was 8 hours, during which time substantially complete conversion of the starting material was obtained. The efficiency to 1,4-pentadienyl 1-acetoxy-4-pentenyl ether and acetic acid was 70 percent. The distillate from the still was redistilled under reduced pressure to yield a 1,4-pentadienyl 1-acetoxy-4-pentenyl ether product of more than 90 percent purity. In addition, the purified 1,4-pentadienyl 1-acetoxy-4-pentenyl ether product had the following physical properties: a boiling point of 65° C. at an absolute pressure of 0.5 millimeter of mercury, a specific gravity of 0.945 at 20/20° C., and a refractive index of 1.4522 at 20° C.

Example V.—Preparation of divinyl ether

The apparatus employed in this experiment comprised an electrically-heated varporizer, a stainless steel reaction tube which was 40 inches long and 0.82 inch in diameter and was heated by an external electric winding, and a water-cooled condenser. The 1-alkenyl 1-acetoxyaliphatic ether feed material was fed in liquid form to the vaporizer, from there in vapor form to the reaction tube, and then to the condenser. The liquid products effluent from the condenser were collected in a suitable receiver.

Over a period of five hours, a total of 1613 grams of vinyl 1-acetoxyethyl ether was subjected to pyrolysis in the above-described apparatus. The reaction tube was maintained at a temperature between 400° C. and 500° C., and at atmospheric pressure. The liquid product weighed 1595 grams, and consisted of 49.6 weight percent divinyl ether, 42.7 weight percent acetic acid 6.3 weight percent vinyl 1-acetoxyethyl ether, and 1.4 weight percent of unidentified material. The degree of conversion of vinyl 1-acetoxyethyl ether was 93.1 percent and the efficiency to divinyl ether and acetic acid was 97.1 percent.

The product mixture was distilled as rapidly as possible through a still column 12 inches long and 41 millimeters in diameter. The distillation was conducted at atmospheric pressure at a reflux ratio of 1 to 20, and was continued until the vapor temperature rose to 30° C. The distillate weighed 790 grams, and consisted of 97 weight percent divinyl ether, 2 weight percent acetic acid, and 1 weight percent of unidentified material.

The distillate was then redistilled at atmospheric pressure through a column 31 millimeters in diameter and 36 inches long. An initial fraction weighing 30 grams was removed at a vapor temperature of 27–28° C. at a reflux ratio of 10 to 1, after which 715 grams of divinyl ether were removed at a vapor temperature of 28° C. and a reflux ratio of 2 to 1. The divinyl ether had a specific gravity of 0.773 at 20/20° C., a refractive index of 1.3987 at 20° C., and an indicated purity of 99.5 percent, determined by bromination with excess bromine followed by reaction of the excess bromine with potassium iodide and back-titration of the liberated iodine with sodium thiosulfate.

Example VI.—Preparation of di(1-propenyl) ether

Using the equipment and general procedure described in Example V, 610 grams of 1-propenyl 1-propionoxypropyl ether was subjected to pyrolysis over a period of 1.5 hours. The reaction tube was maintained at 450° C. to 550° C. and at atmospheric pressure during this period. The liquid product weighed 595 grams, and consisted of 51.8 weight percent di(1-propenyl) ether, 40.0 weight percent propionic acid, 6.2 weight percent 1-propenyl 1-propionoxypropyl ether, and 2 weight percent of unidentified material. The conversion of 1-propenyl 1-propionoxypropyl ether was 91.3 percent, while the efficiency to di(1-propenyl) ether and propionic acid was 97 percent. The product mixture was resolved into its component parts by two distillations, in a manner similar to that described in Example V. In the second distillation, the majority of the di(1-propenyl) ether was recovered at a vapor temperature of 93° C. to 96.5° C. The di(1-propenyl) ether product had a specific gravity of 0.803 at 20/20° C., a refractive index of 1.4312 at 20° C., and an indicated purity of 98.5 percent, determined by bromination. Infrared spectrophotometric analysis indicated that the cis, cis-, cis trans-, and trans, trans-isomers were present in substantially equal amounts.

Example VII.—Preparation of di(1-butenyl) ether

Using the equipment and the same general procedure described in Example V, 1332 grams of 1-butenyl 1-acetoxybutyl ether was subjected to pyrolysis over a period of 2.5 hours. The reaction tube was maintained at a temperature of 375° C. to 475° C. and at atmospheric pressure. The liquid product weighed 1323 grams and consisted of 62.1 weight percent di(1-butenyl) ether, 27.7 weight percent acetic acid, and 10.0 weight percent 1-butenyl 1-acetoxybutyl ether. The indicated conversion of 1-butenyl 1-acetoxybutyl ether was 90.1 percent and the efficiency to di(1-butenyl) ether and acetic acid was 100.7 percent.

A portion of the liquid product mixture which weighed 1315 grams was washed with 2000 grams of water, and the resulting layers separated. The aqueous layer weighed 2360 grams and contained 15 weight percent acetic acid and 0.2 weight percent di(1-butenyl) ether. The organic layer, which contained 1.7 weight percent acetic acid, was then washed with 2000 grams of 5 percent aqueous sodium hydroxide solution. The organic layer was separated and distilled at an absolute pressure of 50 millimeters of mercury through a still column 31 millimeters in diameter and 30 inches in length. A forecut consisting of 13 grams of di(1-butenyl) ether and 2 grams of water was taken at a vapor temperature of 56–60° C. Thereafter, nine fractions of about 100 grams each were taken at vapor temperatures of 60°–73° C. All of these fractions had an indicated purity of 99 weight percent di(1-butenyl) ether, as determined by bromination.

During the distillation, plateaus in the vapor temperature occurred at 60°–61° C., 67°–68° C., and 73° C. The fraction removed at these temperatures were numbered 2, 6, and 10, respectively. These fractions were analyzed by means of the infrared spectrophotometer. Fraction 2 contained 98 weight percent of the cis, cis-isomer, and 2 weight percent of the cis, trans-isomer. Fraction 6 contained 6.3 weight percent of the cis, cis-isomer, 90.3 weight percent of the cis, trans-isomer, and 3.4 weight percent of the trans, trans-isomer. Fraction 10 contained 2.5 weight percent of the cis, trans-isomer and 97.5 weight percent of the trans, trans-isomer. Fraction 2 had a specific gravity of 0.805 at 20/20° C. and a refractive index of 1.4397 at 20° C. Fraction 6 had a specific gravity of 0.812 at 20/20° C. and a refractive index of 1.4419 at 20° C. Fraction 10 had a specific gravity of 0.813 at 20/20° C. and a refractive index of 1.4419 at 20° C.

Example VIII.—Preparation of diisobutenyl ether

Using the equipment and general procedure described in Example V, 877 grams of isobutenyl 1-acetoxyisobutyl ether were subjected to pyrolysis over a period of two hours. During this period, the reaction tube was maintained at a temperature of 335–408° C. and at atmospheric pressure. The liquid product weighed 825 grams, and consisted of 62.5 weight percent diisobutenyl ether, 30.7 weight percent acetic acid, and 6.7 weight percent isobutenyl 1-acetoxyisobutyl ether. The conversion of isobutenyl 1-acetoxyisobutenyl ether was 93.8 percent and the efficiency to diisobutenyl ether and acetic acid was 95.2 percent. The liquid product mixture was extracted simultaneously with an equal volume of hexane and 1.6 volumes of water. Distillation of the hydrocarbon layer under reduced pressure yielded substantially all of the diisobutenyl ether originally contained in the liquid product mixture. This material, which was distilled at a vapor temperature of 65° C. at an absolute pressure of 50 millimeters of mercury, had a specific gravity of 0.816 at 20/20° C. and a refractive index of 1.4458 at 20° C.

Example IX.—Preparation of di(2-ethyl-1-butenyl) ether

Using the equipment and same general procedure as described in Example V, 1730 grams of 2-ethyl-1-butenyl 2-ethyl-1-acetoxybutyl ether were subjected to pyrolysis over a period of 4.75 hours. The reaction tube was maintained at 460°–560° C. and at atmospheric pressure during this period. The liquid product mixture weighed 1713 grams, and consisted of 70.0 weight percent di(2-ethyl-1-butenyl) ether, 23.0 weight percent acetic acid, and 5.0 weight percent 2-ethyl-1-butenyl 2-ethyl-1-acetoxybutyl ether. The conversion of 2-ethyl-1-butenyl 2-ethyl-1-acetoxybutyl ether was 95 percent and the efficiency to di(2-ethyl-1-butenyl) ether and acetic acid was 97 percent.

The liquid product mixture was distilled at reduced pressure through a still column 41 millimeters in diameter and 24 inches long. The acetic acid was distilled at a vapor temperature of 44°–46° C. at an absolute pressure of 50 millimeters of mercury. An intermediate fraction was then removed up to a vapor temperature of 67° C. at an absolute pressure of 1.8 millimeters of mercury. Di(2-ethyl-1-butenyl) ether was then recovered at a vapor temperature of 67° C. at a pressure of 1.8 millimeters of mercury. This product had a specific gravity of 0.831 at 20/20° C. and a refractive index of 1.4568 at 20° C.

*Example X.—Preparation of di(1-butenyl) ether*

Using the equipment and same general procedure as that described in Example V, 1138 grams of 1-butenyl 1-hexanoxybutyl ether was subjected to pyrolysis over a period of four hours. The reaction tube was maintained at 460–570° C. and at an absolute pressure of 100 millimeters of mercury during this period. The liquid product mixture weighed 1123 grams, and consisted of 38.1 weight percent di(1-butenyl) ether, 35.0 weight percent hexanoic acid, and 24.9 weight percent 1-butenyl 1-hexanoxybutyl ether. The conversion of 1-butenyl 1-hexanoxybutyl ether was 75.4 percent and the efficiency to di(1-butenyl) ether and hexanoic acid was 95.8 percent. The liquid product mixture was subjected to rapid stripping at a pressure of 25 millimeters of mercury. The distillate thus obtained was redistilled under reduced pressure to yield a fraction of di(1-butenyl) ether at a vapor temperature of 60°–73° C. at a pressure of 50 millimeters of mercury.

*Example XI.—Preparation of di(1,4-pentadienyl) ether*

Using the equipment and procedure detailed in Example V, 320 grams of 1,4-pentadienyl 1-acetoxy-4-pentenyl ether was subjected to pyrolysis during a period of two hours. The reaction tube was operated at an absolute pressure of 100 millimeters of mercury and at a temperature of 325° C. to 425° C. The liquid product amounted to 315 grams and consisted of 13.4 percent by weight of acetic acid, 33.0 percent by weight of di(1,4-pentadienyl) ether, and 53.0 percent by weight of 1,4-pentadienyl 1-acetoxy-4-pentenyl ether. The conversion of 1,4-pentadienyl 1-acetoxy-4-pentenyl ether was 46.4 percent and the efficiency to di(1,4-pentadienyl) ether was 98 percent.

The crude products mixture was resolved by distillation. First the acetic acid was distilled off at a pressure of 50 millimeters of mercury, absolute. Then an impure di(1,4-pentadienyl) ether fraction was removed at a vapor temperature of 57° C. to 70° C. at an absolute pressure of 6 millimeters of mercury. This fraction, which consisted of 98 percent by weight of di(1,4-pentadienyl) ether and 2 percent by weight of acetic acid, was washed with an equal weight of 2 percent aqueous sodium hydroxide and then redistilled. After removal of a small fraction of di(1,4-pentadienyl) ether and water, pure di (1,4-pentadienyl) ether was distilled at a vapor temperature of 48.2° to 56.3° C. at an absolute pressure of 4 millimeters of mercury. During the distillation cis,cis-di(1,4-pentadienyl) ether, cis, trans-di(1,4-pentadienyl) ether and trans,trans-di(1,4-pentadienyl) ether were all isolated in substantially pure form. The physical properties of these isomers were as follows:

| Isomer | Boiling Point, ° C. | Absolute Pressure, mm. of mercury | Specific Gravity, 20/20 ° C. | Refractive Index, 20 ° C. |
|---|---|---|---|---|
| Cis,cis- | 48.2 | 4.0 | 0.850 | 1.4714 |
| Cis,trans- | 53.6 | 4.0 | 0.857 | 1.4741 |
| Trans,trans- | 56.3 | 4.0 | 0.858 | 1.4741 |

*Example XII.—Preparation of poly[di(1,4-pentadienyl) ether]*

In 86 grams of toluene there was dissolved 0.3 gram of a mixture of 45 percent by weight of boron trifluoride in diethyl ether. The solution was heated to 100° C. and 12.7 grams of a mixture of cis,cis-, cis,trans-, and trans,trans-di(1,4-pentadienyl) ether was added. The temperature of the mixture fell to 80° C. and then rose rapidly to 105° C. After about 30 seconds the temperature began to fall. The mixture was maintained at 100° C. for one hour by the application of external heat, after which it was placed in an open dish and evaporated on a steam bath for six hours. The resulting polymer, which amounted to 12.1 grams, was an adhesive, pasty solid at a temperature of 25° C. It was soluble in hexane, benzene, ethylene dichloride, and isopropyl ether, and was insoluble in isopropanol and water.

Three portions of a mixture of the stereoisomeric di (1,4-pentadienyl) ethers were heated to 90° C. To one portion was added potassium persulfate, to another portion was added azo-bis-isobutyronitrile, and to the third portion was added cumene hydroperoxide. In each case the amount of catalyst added was equal to 0.1 percent by weight of the monomer. No immediate evidence of polymerization was observed in any case. However, after standing for 72 hours at a temperature of 25° C., all of the portions of monomer had polymerized to colorless, adhesive, pasty solids.

*Example XIII.—Preparation of di(1,2,4,5-tetrachloropentyl) ether*

To a reaction flask equipped with a stirrer and a thermometer there was charged 1500 grams of chloroform and 200 grams (1.33 moles) of a mixture of cis,cis-, cis, trans-, and trans,trans-di(1,4-pentadienyl) ether. The flask was immersed in an ice and salt bath and the contents cooled to 0° C. Over a period of two hours 379 grams (5.33 moles) of gaseous chlorine was fed underneath the surface of the contents of the flask. The rate of feed of the chlorine was adjusted so as to maintain the temperature of the reaction at 0° to 5° C. After the reaction was complete, the ice bath was replaced by hot water, a short section of packed column was placed above the reaction flask, and the chloroform solvent was distilled off under reduced pressure. Most of the chloroform was removed at an absolute pressure of 200 millimeters of mercury and at a kettle temperature of 35° to 65° C. During the last stage of the removal of chloroform, the water bath temperature was raised to 98° C. and the absolute pressure was reduced to two millimeters of mercury. When the kettle temperature reached 90° C., all evolution of chloroform ceased. The di(1,2,4,5-tetrachloropentyl) ether product which remained in the kettle amounted to 575 grams, or 99 percent of theory. This material, which was a viscous liquid at a temperature of 25° C., was subjected to elemental analysis, and the following results were obtained.

Theory, weight percent: carbon, 27.7; hydrogen, 3.23; chlorine, 65.4. Found, weight percent: carbon, 27.8; hydrogen, 3.20; chlorine, 65.1.

*Example XIV.—Preparation of di(2,3-dimethyl-1,4-pentadienyl) ether*

Using the equipment and procedure detailed in Example V, 940 grams of 2,3-dimethyl-1,4-pentadienyl 2,3-dimethyl-1-acetoxy-4-pentenyl ether was subjected to pyrolysis during a period of three hours. The reaction tube was operated at an absolute pressure of 200 millimeters of mercury and at a temperature of 350° to 450° C. The liquid product amounted to 920 grams and consisted of 18.9 percent by weight of acetic acid, 64.3 percent by weight of di(2,3-dimethyl-1,4-pentadienyl) ether and 14.9 percent by weight of 2,3-dimethyl-1,4-pentadienyl 2,3 - dimethyl - 1 - acetoxy-4-pentenyl ether. The conversion of 2,3-dimethyl-1,4-pentadienyl 2,3-dimethyl-1-acetoxy-4-pentenyl ether was 85.5 percent, and the efficiency to di(2,3-dimethyl-1,4-pentadienyl) ether was 95.3 percent.

The crude product mixture was resolved by extraction and distillation. The mixture first was extracted twice with double its own volume of water. The resulting organic layer and an equal volume of 10 percent aqueous sodium hydroxide solution then were stirred vigorously together at a temperature of 80° C. for six hours. The purpose of this treatment was to hydrolyze the unreacted starting material still present and thus simplify eventual recovery of the di(alkadienyl) ether. After the foregoing treatment, the layers were separated, and the organic layer was distilled in a conventional manner. First the 2,3-dimethyl-4-pentenal resulting from the hydrolysis of the unreacted 2,3-dimethyl-1,4-pentadienyl 2,3-dimethyl-1-acetoxy-4-pentenyl ether was removed as distillate. Then substantially pure di(2,3-dimethyl-1,4-pentadienyl) ether was recovered at a boiling point of 88° to 97° C. at an absolute pressure of 3.8 millimeters of mercury. Three principal fractions were recovered consisting essentially of the cis,cis-, cis,trans-, and trans,trans-isomers. Physical data for these fractions were as follows:

| Fraction | Isomer | Boiling range, °C. | Absolute Pressure, mm. Hg | Specific Gravity, 20/20° C. | Refractive Index, 20° C. |
|---|---|---|---|---|---|
| 3 | Cis,cis | 88–90 | 3.8 | 0.854 | 1.4756 |
| 5 | Cis,trans | 92.0–92.5 | 3.8 | 0.854 | 1.4779 |
| 8 | Trans,trans | 96.5–97.0 | 3.8 | 0.861 | 1.4800 |

What is claimed is:

1. A process for the production of di(1,2-olefinically unsaturated aliphatic) ethers which have the formula $$R=CH-O-CH=R$$

wherein each R individually represents a divalent aliphatic radical selected from the group consisting of alkylidene and alkenylidene radicals having from one to about eleven carbon atoms wherein the said radical designated as R is saturated in the 2,3-position with respect to the ether oxygen, which comprises heating a 1,2-olefinically unsaturated aliphatic 1-acyloxy aliphatic ether having the formula

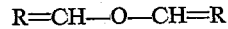

wherein R is as designated above, each R' individually represents a member selected from the group consisting of hydrogen atoms and alkyl and alkenyl radicals having from one to about ten carbon atoms provided that the total number of carbon atoms contained in the two variables designated as R' not exceed about ten, and R'' represents a member selected from the group consisting of hydrogen atoms and alkyl, aryl, and alkenyl radicals having from one to about eleven carbon atoms; to a temperature in the range of from about 300° C. to about 750° C. for from about 0.1 second to about 100 seconds, and recovering the di(1,2-olefinically unsaturated aliphatic) ether thereby produced, said process being carried out in the vapor phase.

2. A process for the production of di(1,2-olefinically unsaturated aliphatic) ethers which have the formula $$R=CH-O-CH=R$$

wherein each R individually represents a divalent aliphatic radical selected from the group consisting of alkylidene and alkenylidene radicals having from one to about eleven carbon atoms wherein the said radical designated as R is saturated in the 2,3-position with respect to the ether oxygen, which comprises heating a 1,2-olefinically unsaturated aliphatic 1-acyloxy aliphatic ether having the formula

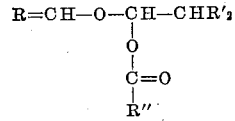

wherein R is as designated above, each R' individually represents a member selected from the group consisting of hydrogen atoms and alkyl and alkenyl radicals having from one to about ten carbon atoms provided that the total number of carbon atoms contained in the two variables designated as R' not exceed about ten, and R'' represents a member selected from the group consisting of hydrogen atoms and alkyl, aryl, and alkenyl radicals having from one to about eleven carbon atoms; to a temperature in the range of from about 300° C. to about 750° C. for from about 1 second to about 25 seconds, and recovering the di(1,2-olefinically unsaturated aliphatic) ether thereby produced, said process being carried out in the vapor phase.

3. A process for the production of di(1,2-olefinically unsaturated aliphatic) ethers which have the formula $$R=CH-O-CH=R$$

wherein each R individually represents a divalent aliphatic radical selected from the group consisting of alkylidene and alkenylidene radicals having from one to about eleven carbon atoms wherein the said radical designated as R is saturated in the 2,3-position with respect to the ether oxygen, which comprises heating a 1,2-olefinically unsaturated aliphatic 1-acyloxy aliphatic ether having the formula

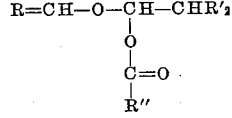

wherein R is as designated above, each R' individually represents a member selected from the group consisting of hydrogen atoms and alkyl and alkenyl radicals having from one to about ten carbon atoms provided that the total number of carbon atoms contained in the two variables designated as R' not exceed about ten, and R'' represents a member selected from the group consisting of hydrogen atoms and alkyl, aryl, and alkenyl radicals having from one to about eleven carbon atoms, to a temperature in the range of from about 325° C. to about 650° C. for from about 2 to about 15 seconds, and recovering the di(1,2-olefinically unsaturated aliphatic) ether thereby produced, said process being carried out in the vapor phase.

4. A process which comprises heating vinyl 1-acetoxyethyl ether to a temperature of from about 300° C. to about 750° C. for from about 0.1 second to about 100 seconds, and producing thereby divinyl ether, said process being carried out in the vapor phase.

5. A process which comprises heating 1-propenyl 1-propionoxypropyl ether to a temperature of from about 300° C. to about 750° C. for from about 0.1 second to about 100 seconds, and producing thereby di(1-propenyl) ether, said process being carried out in the vapor phase.

6. A process which comprises heating 1-butenyl 1-acetoxybutyl ether to a temperature of from about 300° C. to about 750° C. for from about 0.1 second to about 100 seconds, and producing thereby di(1-butenyl) ether, said process being carried out in the vapor phase.

7. A process which comprises heating isobutenyl 1-acetoxyisobutyl ether to a temperature of from about 300° C. to about 750° C. for from about 0.1 second to about 100 seconds, and producing thereby diisobutenyl ether, said process being carried out in the vapor phase.

8. A process which comprises heating 2-ethyl-1-butenyl 2-ethyl-1-acetoxybutyl ether to a temperature of from about 300° C. to about 750° C. for from about 0.1 second to about 100 seconds, and producing thereby di(2-ethyl-1-butenyl) ether, said process being carried out in the vapor phase.

9. A process which comprises heating 1-butenyl 1-hexanoxybutyl ether to a temperature of from about 300° C. to about 750° C. for from about 0.1 second to about 100 seconds, and producing thereby di(1-butenyl) ether, said process being carried out in the vapor phase.

10. A process which comprises heating 1,4-pentadienyl 1-acetoxy-4-pentenyl ether to a temperature of from about 300° C. to about 750° C. for from about 0.1 second to about 100 seconds, and producing thereby di(1,4-pentadienyl) ether, said process being carried out in the vapor phase.

11. A process which comprises heating 2,3-dimethyl-1,4-pentadienyl 2,3-dimethyl-1-acetoxy-4-pentenyl ether to a temperature of from about 300° C. to about 750° C. for from about 0.1 second to about 100 seconds, and producing thereby di(2,3-dimethyl-1,4-pentadienyl) ether, said process being carried out in the vapor phase.

References Cited by the Examiner
UNITED STATES PATENTS 2,962,534 11/1960 Montagna et al. ____ 260—614
3,061,649 10/1962 Erickson et al. ____ 260—614 X

OTHER REFERENCES

Erickson et al., "Synthesis of 1-Alkenyl Alkyl Ethers," Journal of Organic Chemistry (pp. 670–672), vol. 23, No. 5, May 1958.

Groggins, Unit Processes in Organic Synthesis (1952), pp. 86, 180, 196, 434, 490, 512, 551, 652 and 833.

LEON ZITVER, *Primary Examiner.*

HAROLD N. BURSTEIN, *Examiner.*

L. M. MILLER, B. HELFIN, *Assistant Examiners.*